(12) United States Patent
Poe et al.

(10) Patent No.: US 8,372,302 B2
(45) Date of Patent: Feb. 12, 2013

(54) MAGNESIUM CHLORIDE AND POTASSIUM SULFATE DEICER

(75) Inventors: Jerry Poe, Hutchinson, KS (US); Douglas N. Excell, Overland Park, KS (US); Patricia Ries, Kansas City, MO (US); Kristopher Shelite, Moundridge, KS (US)

(73) Assignee: North American Salt Company, Overland Park, KS (US)

( * ) Notice: Subject to any disclaimer, the term of this patent is extended or adjusted under 35 U.S.C. 154(b) by 265 days.

(21) Appl. No.: 12/859,651

(22) Filed: Aug. 19, 2010

(65) Prior Publication Data

US 2012/0043498 A1 Feb. 23, 2012

(51) Int. Cl.
 *C09K 3/18* (2006.01)
(52) U.S. Cl. ............................................ 252/70; 106/13
(58) Field of Classification Search .................... 106/13; 252/70
 See application file for complete search history.

(56) References Cited

U.S. PATENT DOCUMENTS

| | | | |
|---|---|---|---|
| 1,825,151 A | 9/1931 | Keoleian | |
| 3,772,202 A | 11/1973 | Neitzel et al. | |
| 4,195,070 A * | 3/1980 | Allain et al. | 423/498 |
| 4,412,931 A | 11/1983 | Lane et al. | |
| 4,448,702 A | 5/1984 | Kaes | |
| 4,597,883 A | 7/1986 | Lengyel | |
| 4,597,884 A | 7/1986 | Greenwald | |
| 4,654,157 A | 3/1987 | Fukunaga | |
| 4,746,449 A | 5/1988 | Peel | |
| 5,298,050 A * | 3/1994 | McLaughlin et al. | 71/63 |
| 5,302,307 A | 4/1994 | Ireland | |
| 5,645,755 A | 7/1997 | Wiesenfeld et al. | |
| 5,849,356 A | 12/1998 | Gambino et al. | |
| 5,853,610 A | 12/1998 | Kaes | |
| 5,980,774 A | 11/1999 | Sapienza | |
| 6,156,226 A | 12/2000 | Klyosov et al. | |
| 6,506,318 B1 | 1/2003 | Sapienza et al. | |
| 6,541,050 B1 * | 4/2003 | Bonorden et al. | 426/74 |
| 6,821,453 B2 | 11/2004 | Chon et al. | |
| 6,861,009 B1 | 3/2005 | Leist | |
| 6,890,451 B2 | 5/2005 | Sapienza et al. | |
| 7,048,871 B2 | 5/2006 | Chauhan et al. | |
| 7,138,071 B2 | 11/2006 | Sapienza et al. | |
| 7,314,577 B2 | 1/2008 | Koefod | |
| 7,556,742 B1 | 7/2009 | Ghaemaghami Rad | |
| 7,563,385 B2 | 7/2009 | Sapienza | |
| 7,588,696 B2 | 9/2009 | Koefod | |
| 7,632,421 B2 | 12/2009 | Bytnar | |
| 7,658,948 B2 | 2/2010 | Lynch et al. | |
| 7,820,225 B2 * | 10/2010 | Zuniga | 426/649 |
| 2006/0169947 A1 | 8/2006 | Leist | |

FOREIGN PATENT DOCUMENTS

EP 0 490 796 A1 6/1992
JP 63-307802 A * 12/1988

OTHER PUBLICATIONS

Derwent-Acc-No. 1983-723519, abstract of DD 159765A (Apr. 1983).*
Derwent-Acc-No. 1989-301240, abstract of DD 267975A (May 1989).*
Derwent-Acc-No. 1997-109549, abstract of CN 1078705 A (Nov. 1993).*
Cargill Technical Information: Bulk Ice Control Salt and ClearLane enhanced deicer, Product Data sheets, 4 pages.
Montana Chapter, Northwest Log Truckers Cooperative, Magnesium Chloride on Roads, Feb. 24, 2003, www.logtrucker.com/magchloride.htm, 24 pages.
Magnesium Chloride as a De-Icing Agent, 2001, USDA, www.usda.gov/rus/electric/engineering/2001/magnesium_chloride.htm, 2 pages.

* cited by examiner

*Primary Examiner* — Anthony J Green
(74) *Attorney, Agent, or Firm* — Hovey Williams LLP

(57) ABSTRACT

Deicing compositions comprising magnesium chloride and potassium sulfate are provided. The compositions are pet friendly and have less of a detrimental impact on the environment and vegetation than prior art compositions. Methods of reducing or preventing the build-up of ice or snow on various surfaces are also provided.

16 Claims, 1 Drawing Sheet

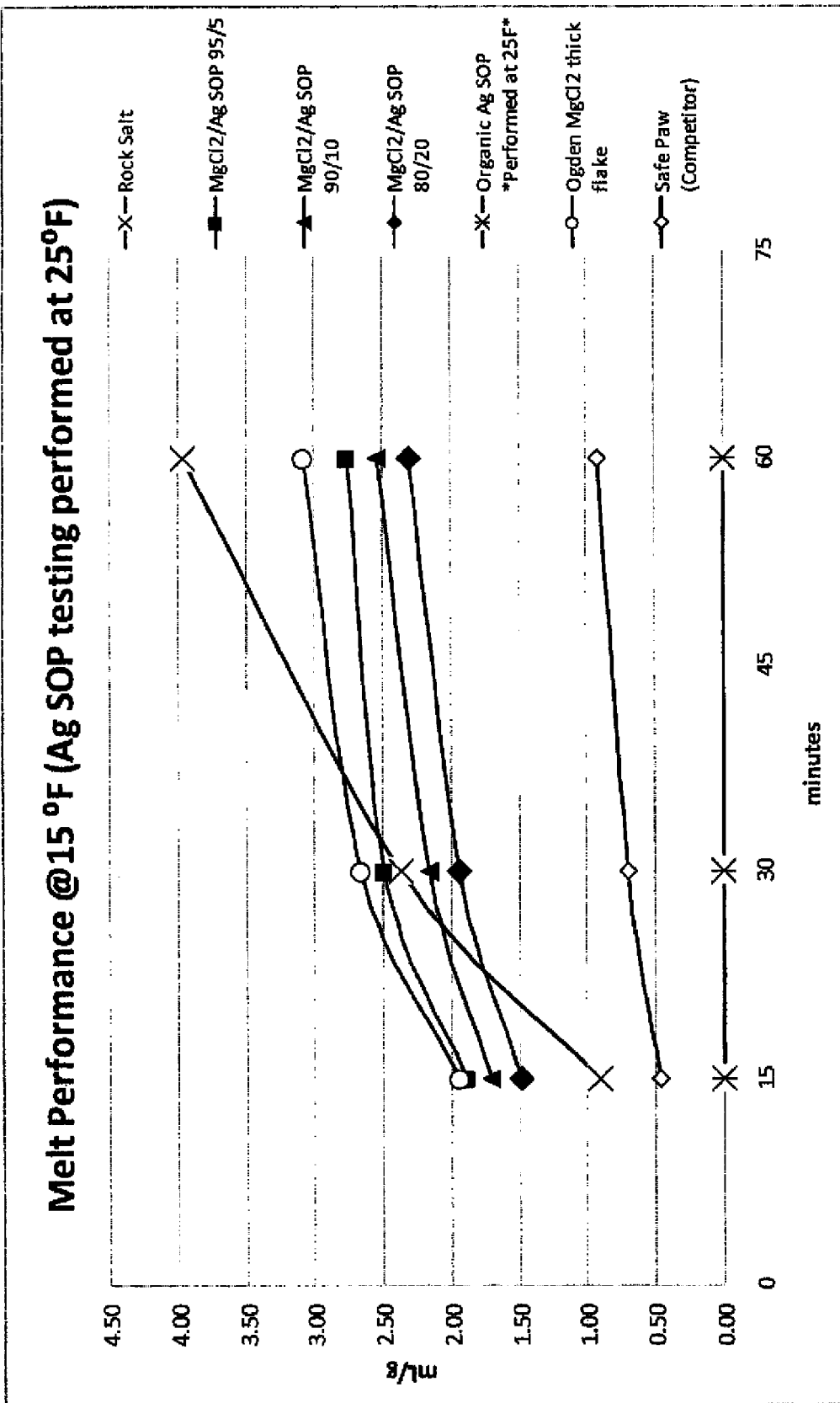

MAGNESIUM CHLORIDE AND POTASSIUM SULFATE DEICER

BACKGROUND OF THE INVENTION

1. Field of the Invention

The present invention relates to improved deicing compositions comprising magnesium chloride and potassium sulfate.

2. Description of Related Art

Freezing-point lowering compositions (or deicing compositions) are commonly used to reduce or prevent the build-up of ice and snow on various surfaces, such as roadways, sidewalks, and driveways. They work by lowering the freezing point of the ice itself, so that the ice and snow melt. Traditional solid deicing compositions include rock salt (NaCl), calcium chloride, and urea, with rock salt being the most commonly used. Liquid deicing compositions can also be used and include ethylene and propylene glycol and various alcohols.

Traditional deicing compositions have a number of drawbacks, including their corrosive effect on the surrounding environment, as well as their negative impact on soil, water, and animals. For example, sodium chloride accumulation via water runoff from traditional deicing salt tends to diminish permeability of the soil and increase its alkalinity. High levels of sodium also cause the loss of vital plant nutrients such as potassium, calcium, and magnesium from surrounding vegetation. Chloride salts can also inhibit water uptake by roots of plants and trees. As a result, many traditional deicing salts damage vegetation, such as trees and grass, along roadways where salt is applied. Traditional chloride salts, such as sodium chloride and calcium chloride, can also be harmful to the skin of animals, such as pet paws, and have a corrosive effect on motor vehicles and cause surface damage or scaling on concrete. Likewise, glycols can be detrimental to aquatic life and to sewage treatment processes, while alcohols have toxic effects and high volatility, particularly at low molecular weights. Thus, attempts have been made to create new deicing compositions that minimize impact on the environment including the people and pets who come into contact with such compositions. However, existing "pet friendly" deicing compositions have poor ice melting capabilities. Urea, an ingredient commonly used in pet friendly deicers is also prone to being blown away even before melting begins, and is very susceptible to refreezing. Accordingly, there remains a need in the art for pet friendly deicing compositions that also have a less corrosive effect on the environment without sacrificing melting performance.

SUMMARY OF THE INVENTION

The present invention is broadly concerned with deicing compositions consisting essentially of magnesium chloride and potassium sulfate. The invention is also directed towards methods of melting or preventing the build-up of ice or snow on a surface. The method comprises applying a composition consisting essentially of magnesium chloride and potassium sulfate to said surface. The invention also provides a deicing composition comprising magnesium chloride and potassium sulfate, wherein the composition is substantially free of magnesium sulfate, calcium chloride, sodium chloride, glycerol-containing by-products, and alcohols. The invention is also concerned with methods of melting or preventing the build-up of ice or snow on a surface. The method comprises applying a composition comprising magnesium chloride and potassium sulfate to a surface, wherein the composition is substantially free of magnesium sulfate, calcium chloride, sodium chloride, glycerol-containing by-products, and alcohols.

BRIEF DESCRIPTION OF THE DRAWINGS

FIG. 1 is a graph comparing the melting performance of various deicing compositions from Example 1.

DETAILED DESCRIPTION OF THE INVENTION

The present invention is concerned with a salt composition comprising a blend of magnesium chloride and potassium sulfate that provides improved deicing. The blended composition preferably comprises from about 40 to about 99% by weight magnesium chloride, more preferably from about 70 to about 90% by weight magnesium chloride, and even more preferably from about 80 to about 90% by weight magnesium chloride, based upon the total weight of the blend taken as 100% by weight. The composition also preferably comprises from about 1 to about 50% by weight potassium sulfate, more preferably from about 5 to about 30% by weight potassium sulfate, and even more preferably from about 10 to about 20% by weight potassium sulfate, based upon the total weight of the blend taken as 100% by weight. The weight ratio of magnesium chloride to potassium sulfate in the blend is preferably from about 50:50 to about 95:5, more preferably from about 80:20 to about 95:5, and even more preferably from about 80:20 to about 90:10. In one aspect, the composition consists essentially of, or even consists of, magnesium chloride and potassium sulfate.

The composition is substantially free of other inorganic salts or freezing-point lowering compounds. For example, the composition is preferably substantially free of calcium chloride, magnesium sulfate, sodium chloride, glycerol-containing by-products, and alcohols. More specifically, each of the foregoing ingredients is preferably present in the composition at a level of less than about 5% by weight, more preferably less than about 2% by weight, and even more preferably less than about 1% by weight, based upon the total weight of the composition taken as 100% by weight. Glycerol-containing by-products include those resulting from triglyceride processing processes (e.g. saponification, hydrolysis, transesterification, etc.). Alcohols include, for example, ethanols, methanols, and sugar alcohols.

The blend preferably comprises discrete pieces of solid magnesium chloride and potassium sulfate. The magnesium chloride for use in the blend is preferably provided as magnesium chloride hexahydrate ($MgCl_2 \cdot 6H_2O$). Regardless of the embodiment, the magnesium chloride pieces preferably have an average maximum surface-to-surface dimension of from about 1 mm to about 15 mm, more preferably from about 2 mm to about 10 mm, and even more preferably from about 3 mm to about 6 mm. The potassium sulfate pieces preferably have an average maximum surface-to-surface dimension of from about 2 mm to about 15 mm, more preferably from about 3 mm to about 10 mm, and even more preferably from about 4 mm to about 8 mm. More preferably, the potassium sulfate (also known as sulfate of potash ("SOP")) is preferably provided as fertilizer- or agricultural-grade granules or pellets having a size guide number (SGN) of from about 10 to about 500, more preferably from about 100 to about 400, and even more preferably from about 300 to about 400. The SOP, granules or pellets also preferably have a uniformity index (UI) of from about 0 to about 100, more preferably from about 20 to about 80, and even more preferably from about 40 to about 60. Certified organic SOP granules are particularly preferred. It will be appreciated that larger pieces could also be used for the magnesium chloride and/or potassium sulfate pieces, for example, in the shape of cubes ranging from about 0.5 inches to about 2 inches length, from about 0.5 to about 2 inches in width, and about ½ inch thick.

The composition can be prepared by physically mixing the magnesium chloride and potassium sulfate in the desired amounts to create a substantially homogenous blend, where each component is uniformly intermixed. That is, the magnesium chloride and potassium sulfate can be individually provided as discrete pieces of magnesium chloride or potassium sulfate (i.e., in particulate form, such as pellets, cubes, granules, flakes, powder, or crystals), which can then be physically or mechanically mixed together, bagged, and sold.

A number of additional optional ingredients can also be included in the composition, such as dyes, lignin sulfonate, sodium sulfate, sodium silicates, and mixtures thereof. For example, lignin sulfonate is sometimes found in small amounts (~2% w/w) in SOP granules, and thus may also be present in the inventive deicing compositions. Dyes are also sometimes included in deicing compositions to provide visual confirmation of the presence of the deicing composition on a given surface.

The moisture content of the composition will preferably be from about 0% to about 5% by weight, preferably from about 0% to about 1% by weight, and more preferably from about 0% to about 0.5% by weight, based upon the total weight of the composition taken as 100% by weight. The composition has good storage stability. More particularly, the composition preferably remains free of clumping, caking, or liquefying for at least about 180 days, and more preferably at least about 365 days when stored in a closed container at about 50% relative humidity. The composition also preferably remains a homogenous blend with good flowability for at least about 180 days, and more preferably at least about 365 days when stored in a closed container at about 50% relative humidity.

In use, the inventive composition is applied or dispersed onto a surface, such as a roadway, driveway, walkway, sidewalk, patio, porch, parking lot, other paved surfaces, or any other surface where snow and ice may accumulate to thereby melt or prevent the formation of snow and ice on the treated surface. The composition is preferably applied to the surface at a level of from about 10 to about 100 grams of composition per square yard of the surface, more preferably from about 30 to about 70 grams of composition per square yard of the surface, and even more preferably from about 40 to about 60 grams of composition per square yard of the surface. The magnesium chloride in the composition melts or prevents snow and ice formation, while the potassium sulfate, which is not as hygroscopic as magnesium chloride, takes longer to dissolve and provides traction. When subjected to a melting performance test as described in Example 1, the inventive composition preferably generates at least about 1 mL brine per gram of inventive composition after about 60 minutes, more preferably from about 1 to about 3 mL brine per gram of composition after about 60 minutes, and even more preferably from about 1.5 to about 2.5 mL brine per gram of composition after about 60 minutes.

The inventive compositions provide a number of advantages over traditional deicing products. For example, the inventive compositions are non-irritating to the skin, making them safer for many pets than some traditional deicing compositions. That is, the compositions have dermal Primary Irritation Index of less than about 1.00, and preferably about 0.00. The compositions also have less of a detrimental impact on the environment and vegetation. Advantageously, the inventive deicing compositions may also have a beneficial impact on vegetation near and around surfaces treated with the inventive compositions. For example, potassium sulfate provides essential elements (potassium and sulfur) vital to many plant functions. Thus, the inventive compositions are less damaging to plants and vegetation around and near treated surfaces when the deicing composition eventually washes away from the surface due to water runoff. Potassium sulfate also does not affect soil acidity or alkalinity and is safe when it enters groundwater. Thus, the present deicing compositions may even help offset vegetation damage caused by traditional rock salt deicing compositions.

EXAMPLES

The following examples set forth preferred methods in accordance with the invention. It is to be understood, however, that these examples are provided by way of illustration and nothing therein should be taken as a limitation upon the overall scope of the invention.

Example 1

Melting Performance

In this Example, the melting performance of various compositions was tested as a function of time and temperature using standardized methodology from the Strategic Highway Research Program (SHRP). Test method SHRP H-205.1 was followed. Flat circular test dishes, 9-in. in diameter and ¾-in. deep were first constructed from two pieces of Plexiglas®. One piece was ¼-in.×11-in square and served as the bottom of the dish, and another piece was ¾-in.×11-in. square with a 9-in. diameter hole cut out of the center, and served as the sides of the dish when the two pieces were joined together face-to-face. A low-temperature thermometer and a digital timer were then attached to one edge of each dish. The dishes were flushed with ethanol to remove oils and grease.

To prepare the ice, 130 mL of distilled water were placed in each test dish and swirled to distribute the water over the dish surface. The dishes were then placed in a freezer on a level surface and frozen. The dishes were then placed in a constant temperature enclosure at 15° F., and equilibrated over night.

Next, about a 4.17±0.05-gram sample of each deicing composition was weighed out and placed in the constant temperature enclosure to equilibrate to the testing temperature for 1 hour. Three different inventive compositions were tested: 80/20, 90/10, and 95/5 magnesium chloride/potassium sulfate. Agricultural grade organic potassium sulfate ("Ag SOP") was used for the testing. The melt performance of traditional rock salt, magnesium chloride flakes (from Ogden, Utah), and a commercially-available "pet friendly" deicer (Safe Paw Ice Melter; Gaia Enterprises; Richboro, Pa.) was also tested. The melt performance of Ag SOP alone was also tested using this same procedure; however, because SOP does not melt any ice at 15° F., the temperature was increased to 25° F. to see if any melting would occur at the higher temperature. Multiple dishes were prepared for each composition tested.

Each deicing composition was then spread as uniformly as possible over the ice surface of each respective dish in the constant temperature enclosure. About 15 minutes after applying the deicing compositions, each dish was tilted to allow the generated brine (if any) to flow to the perimeter of the dish. Brine was withdrawn using a syringe for 90 seconds, and the brine volume for each dish and composition was recorded. The brine was then returned to each respective dish by injecting the brine, as much as possible, into the cavities of the ice. The brine collection was repeated at 30 and 60 minutes into the test. The mL of brine per gram of deicer was then calculated for each dish, and the averages for each composition were determined. The results are shown in the Tables below, with the averages being plotted in the graph shown in FIG. 1.

TABLE 1

$MgCl_2$/Ag SOP 95/5 Melt Performance

| | Time (min.) | Brine vol. (mL) | Brine wt. (g) | Deicer wt. (g) | mL/g |
|---|---|---|---|---|---|
| Dish 1A | 15 | 7.7 | 8.214 | 4.182 | 1.84 |
| | 30 | 9.6 | 10.220 | | 2.30 |
| | 60 | 11.0 | 11.376 | | 2.63 |
| Dish 1B | 15 | 8.2 | 8.676 | 4.172 | 1.97 |
| | 30 | 11.0 | 11.125 | | 2.64 |
| | 60 | 12.0 | 12.414 | | 2.88 |
| Dish 1C | 15 | 7.7 | 8.067 | 4.141 | 1.86 |
| | 30 | 10.5 | 10.789 | | 2.54 |
| | 60 | 11.5 | 11.941 | | 2.78 |
| Averages | 15 | 7.87 | 8.319 | 4.165 | 1.89 |
| | 30 | 10.37 | 10.711 | | 2.49 |
| | 60 | 11.50 | 11.910 | | 2.76 |

TABLE 2

$MgCl_2$/Ag SOP 90/10 Melt Performance

| | Time (min.) | Brine vol. (mL) | Brine wt. (g) | Deicer wt. (g) | mL/g |
|---|---|---|---|---|---|
| Dish 2A | 15 | 7.0 | 7.54 | 4.169 | 1.68 |
| | 30 | 8.2 | 9.884 | | 1.97 |
| | 60 | 10.3 | 10.646 | | 2.47 |
| Dish 2B | 15 | 7.2 | 7.680 | 4.132 | 1.74 |
| | 30 | 9.5 | 9.641 | | 2.30 |
| | 60 | 11.2 | 11.541 | | 2.71 |
| Dish 2C | 15 | 7.0 | 7.425 | 4.163 | 1.68 |
| | 30 | 9.2 | 9.438 | | 2.21 |
| | 60 | 10.1 | 10.432 | | 2.43 |
| Averages | 15 | 7.07 | 7.548 | 4.155 | 1.70 |
| | 30 | 8.97 | 9.654 | | 2.16 |
| | 60 | 10.53 | 10.873 | | 2.54 |

TABLE 3

$MgCl_2$/Ag SOP 80/20 Melt Performance

| | Time (min.) | Brine vol. (mL) | Brine wt. (g) | Deicer wt. (g) | mL/g |
|---|---|---|---|---|---|
| Dish 3A | 15 | 6.6 | 7.189 | 4.178 | 1.58 |
| | 30 | 8.6 | 9.230 | | 2.06 |
| | 60 | 10.4 | 11.071 | | 2.49 |
| Dish 3B | 15 | 6.5 | 6.655 | 4.173 | 1.56 |
| | 30 | 8.5 | 8.735 | | 2.04 |
| | 60 | 10.0 | 10.239 | | 2.40 |
| Dish 3C | 15 | 5.5 | 5.647 | 4.170 | 1.32 |
| | 30 | 7.2 | 7.435 | | 1.73 |
| | 60 | 8.5 | 8.694 | | 2.04 |
| Averages | 15 | 6.20 | 6.497 | 4.174 | 1.49 |
| | 30 | 8.10 | 8.467 | | 1.94 |
| | 60 | 9.63 | 10.001 | | 2.31 |

TABLE 4

Rock Salt Melt Performance Melt Performance

| | Time (min.) | Brine vol. (mL) | Brine wt. (g) | Deicer wt. (g) | mL/g |
|---|---|---|---|---|---|
| Dish 4A | 15 | 4.2 | 5.469 | 4.179 | 1.01 |
| | 30 | 10.0 | 11.102 | | 2.39 |
| | 60 | 17.3 | 18.523 | | 4.14 |
| Dish 4B | 15 | 3.2 | 3.129 | 4.169 | 0.77 |
| | 30 | 9.2 | 9.657 | | 2.21 |
| | 60 | 15.4 | 16.690 | | 3.69 |
| Dish 4C | 15 | 4.0 | 4.154 | 4.181 | 0.96 |
| | 30 | 10.5 | 10.965 | | 2.51 |
| | 60 | 17.0 | 18.271 | | 4.07 |
| Averages | 15 | 3.80 | 3.917 | 4.176 | 0.91 |
| | 30 | 9.90 | 10.575 | | 2.37 |
| | 60 | 16.57 | 17.828 | | 3.97 |

TABLE 5

Organic Ag SOP Melt Performance (at 25° F.)

| | Time (min.) | Brine vol. (mL) | Brine wt. (g) | Deicer wt. (g) | mL/g |
|---|---|---|---|---|---|
| Dish 5A | 15 | 0.0 | 0.0 | 4.165 | 0.00 |
| | 30 | 0.0 | 0.0 | | 0.00 |
| | 60 | 0.0 | 0.0 | | 0.00 |
| Dish 5B | 15 | 0.0 | 0.0 | 4.171 | 0.00 |
| | 30 | 0.0 | 0.0 | | 0.00 |
| | 60 | 0.0 | 0.0 | | 0.00 |
| Dish 5C | 15 | 0.0 | 0.0 | 4.189 | 0.00 |
| | 30 | 0.0 | 0.0 | | 0.00 |
| | 60 | 0.0 | 0.0 | | 0.00 |
| Averages | 15 | 0.00 | 0.0 | 4.175 | 0.00 |
| | 30 | 0.00 | 0.0 | | 0.00 |
| | 60 | 0.00 | 0.0 | | 0.00 |

TABLE 6

$MgCl_2$ Thick Flakes Melt Performance

| | Time (min.) | Brine vol. (mL) | Brine wt. (g) | Deicer wt. (g) | mL/g |
|---|---|---|---|---|---|
| Dish 6A | 15 | 8.3 | 9.063 | 4.188 | 1.98 |
| | 30 | 11.4 | 11.92 | | 2.72 |
| | 60 | 13 | 13.45 | | 3.10 |
| Dish 6B | 15 | 7.9 | 8.603 | 4.168 | 1.90 |
| | 30 | 10.8 | 11.34 | | 2.59 |
| | 60 | 12.7 | 13.14 | | 3.05 |
| Averages | 15 | 8.10 | 8.83 | 4.178 | 1.94 |
| | 30 | 11.10 | 11.63 | | 2.66 |
| | 60 | 12.85 | 13.29 | | 3.08 |

TABLE 7

Safe Paw Ice Melter Melt Performance

| | Time (min.) | Brine vol. (mL) | Brine wt. (g) | Deicer wt. (g) | mL/g |
|---|---|---|---|---|---|
| Dish 7A | 15 | 2.0 | 1.911 | 4.142 | 0.48 |
| | 30 | 3.0 | 3.091 | | 0.72 |
| | 60 | 3.8 | 4.041 | | 0.92 |
| Dish 7B | 15 | 2.0 | 1.946 | 4.160 | 0.48 |
| | 30 | 2.8 | 2.993 | | 0.67 |
| | 60 | 3.8 | 3.916 | | 0.91 |
| Dish 7C | 15 | 1.8 | 1.582 | 4.150 | 0.43 |
| | 30 | 2.9 | 2.632 | | 0.70 |
| | 60 | 3.8 | 3.708 | | 0.92 |
| Averages | 15 | 1.93 | 1.813 | 4.151 | 0.47 |
| | 30 | 2.90 | 2.905 | | 0.70 |

TABLE 7-continued

Safe Paw Ice Melter Melt Performance

| Time (min.) | Brine vol. (mL) | Brine wt. (g) | Deicer wt. (g) | mL/g |
|---|---|---|---|---|
| 60 | 3.80 | 3.888 | | 0.92 |

According to the results of the melt performance tests, the inventive compositions are of the composition at the lowest ration. The 95/5 $MgCl_2$/Ag SOP composition performed almost as well as traditional deicers such as rock salt and $MgCl_2$ flake. All of the inventive compositions performed much better than the commercially-available "pet friendly" deicing composition, generating about three times as much brine as the commercially-available "pet friendly" deicer at any given time. As seen in Table 6 above, as well as in FIG. 1, potassium sulfate alone is not effective for melting ice and showed no ice melting capability over the 60-minute testing period, even when the temperature was elevated to 25° F.

Example 2

Humidity and Storage Stability

In this Example, the humidity and storage stability of the inventive deicing compositions was tested over a period of 30 days in a humidity cabinet to simulate stability over one year of actual shelf life. Three different compositions were tested: 80/20, 90/10, and 95/5 magnesium chloride/potassium sulfate. The testing was performed in a humidity chamber at a constant temperature of 32.5° C. and 50-51% relative humidity. Each product was in a sealable container. At the beginning of the test, the containers were opened, and the compositions were visually inspected. The containers were then slowly and gently swirled to check product flowability. All of the compositions were observed to flow well and have no visible surface clumping, caking, or liquefying. The containers were sealed and placed in the humidity chamber. After 30 days, the containers were removed from the chamber and allowed to come to ambient temperature. The containers were opened and visually inspected for clumping, caking, liquefying, and flowability. All of the compositions remained free of visible surface clumping, caking, or liquefying, and continued to flow well.

Example 3

Irritation Testing

According to the Canadian Centre for Occupational Health and Safety, magnesium chloride is a known non-irritant. Thus, in this Example, the irritation potential of potassium sulfate was tested according to the Primary Irritation Index of the Consumer Product Safety Commission, Title 16, Chapter II, Part 1500 and Federal Hazaradous Substances Act (FHSA). The FHSA-recommended Draize technique scoring criteria (Draize, J. H., et al., J. Pharm. Exp. Ther. 82:377-390 (1944)), were used to determine if potassium sulfate would be suitable for use in a pet friendly deicing composition.

1. Eye Irritation Test

To test the potential of potassium sulfate as an ocular irritant, six healthy New Zealand White rabbits, free from any evidence of ocular irritation and corneal abnormalities, were selected for testing. Agricultural grade potassium sulfate was used for the tests. The potassium sulfate granules were ground with a mortar and pestle prior to dosing. Next, 0.092 mg of potassium sulfate was placed by syringe-type applicator into the conjunctival sac of one eye of each rabbit by gently pulling the lower eyelid away from the eye. The lids were then held together briefly to insure adequate distribution of the sample. Using a flashlight equipped with a high intensity bulb, the test eye of each rabbit was examined for irritation of the cornea, iris, and conjunctiva on days 1, 2, and 3 post-dose. Ocular reactions were graded according to the numerical Draize scoring scale below.

| Cornea: | Score |
|---|---|
| (A) Opacity: Degree of density (are most dense taken for reading) | |
| No Ulceration or opacity | 0 |
| Scattered or diffuse areas of opacity (other than slight dulling of normal luster), details of iris clearly visible | 1 |
| Easily discernible translucent area, details of iris slightly obscured | 2 |
| Opalescent areas, no details of iris visible, size of pupil barely discernible | 3 |
| Opaque cornea, iris not discernible through opacity | 4 |
| (B) Area of Cornea Involved: | |
| One-quarter or less, but not zero | 1 |
| > one-quarter, but < one-half | 2 |
| > one-half, but < three-quarters | 3 |
| > three-quarters up to whole area | 4 |
| SCORE (A × B × 5) Maximum Total | 80 |

| Iris: | |
|---|---|
| (A) Normal | 0 |
| Folds above normal, congestion, swelling, circumcorneal injection (combinations thereof), iris still reacting to light | 1 |
| No reaction to light, hemorrhage, and/or gross destruction | 2 |
| SCORE (A × 5) Maximum Total | 10 |

| Conjunctivae: | |
|---|---|
| (A) Redness: Palpebral and bulbar cunjunctivae excluding cornea/iris | |
| Blood vessels normal | 0 |
| Some blood vessels hyperemic (injected) | 1 |
| More diffuse, deeper crimson red, individual vessels not easily discernible | 2 |
| Diffuse beefy red | 3 |
| (B) Chemiosis: | |
| No swelling | 0 |
| Any swelling above normal | 1 |
| Obvious swelling with partial eversion of lids | 2 |
| Swelling with lids about half-closed | 3 |
| Swelling with lids more than half-closed | 4 |
| (C) Discharge: | |
| No discharge | 0 |
| Any amount above normal | 1 |
| Discharge with moistening of lids and hairs adjacent lids | 2 |
| Discharge with moistening of considerable area around eye | 3 |
| SCORE ((A + B + C) × 2) Maximum Total | 20 |

The general health of the animals was also monitored during each observation time. The primary eye irritation score for each rabbit was calculated from the weighted Draize scale. The irritation potential was determined by counting the number of rabbits with positive irritation on days 1, 2, or 3. Positive irritation was defined as any score for opacity or iritis, or a score of 2 or more for redness or chemosis:

Non-irritant—0 or 1 animals with a positive score at any time period;

Indeterminate—2 to 3 animals with a positive score at any time period; and

Irritant—4 or more animals with a positive score at any time period.

There was no corneal opacity or iritis noted at any observation period. However, cunjunctival irritation and redness was noted in 4/6 eyes, but cleared by day 3. One animal was noted with diarrhea at day 3, all other animals appeared normal throughout the observation period. Based upon these tests, potassium sulfate is a primary ocular irritant.

2. Dermal Irritation Test

To test the potential of potassium sulfate as a dermal irritant, six healthy New Zealand White rabbits were selected for testing. Agricultural grade potassium sulfate was used for the tests. To prepare the test samples, 0.5 grams of potassium sulfate were weighed into a container and 0.5 ml of distilled water was added to make a 50% w/v mixture. Prior to the application of the test samples, the back and sides of each animal were clipped free of hair. The left side of each animal was abraded with a bent tip needle. Three abrasions extending the length of the exposure site were made. The abrasions were deep enough to penetrate the stratum corneum, but not deep enough to produce bleeding. The right side of each animal remained intact. Each sample was applied to the exposure sites on each animal, which were then covered with a 2.5×2.5 cm gauze patch secured with non-irritating tape. Gentle pressure was applied to the gauze to aid in the distribution of the test substance over the test site. The torso of each animal was covered with a piece of impermeable dressing material large enough to cover both test sites with at least 5 cm to spare on all sizes of the gauze patches. Non-irritating tape was then used to encircle the entire trunk of each animal between the hips and shoulders and seal the test sites from exposure to air. This occlusive covering was used to prevent evaporation of the test article. The sites were wrapped for 24 hours, after which time, the wrapping and gauze patches were removed. Residual potassium sulfate sample was removed from each test site by gently washing with distilled water. The test sites were observed for erthyema and edema, according to the Draize scoring technique below, and the results were recorded.

| Erythema and Eschar | |
|---|---|
| No erythema | 0 |
| Very slight erythema (barely perceptible) | 1 |
| Well defined erythema | 2 |
| Moderate to severe erythema | 3 |
| Severe erythema (beet redness) to slight eschar formation (injuries in depth) | 4 |

| Edema | |
|---|---|
| No edema | 0 |
| Very slight edema (barely perceptible) | 1 |
| Slight edema (edges of area well-defined by raising) | 2 |
| Moderate edema (raised approx. 1.0 mm) | 3 |
| Severe edema (raised more than 1.0 mm, extending beyond test site) | 4 |

The test sites were checked again for erthyema and edema 72 hours post-dosing. The overall health of each animal was monitored during each observation period. None of the abraded or intact test sites exhibited any erythema or edema 24 or 72 hours post-dosing. The Primary Irritation Index for potassium sulfate was recorded as being 0, meaning that potassium sulfate is not a primary dermal irritant. Thus, it was determined that potassium sulfate would be suitable for use in a pet friendly deicer, as being safe for pet paws. Accordingly, deicing compositions of the invention will be dermal non-irritants (for intact or abraded skin), and will have a dermal Primary Irritation Index of less than about 1.00, and preferably about 0.00.

Example 4

Deicer Stain Testing

In this Example, the potential for the inventive deicing compositions at various concentrations to stain carpet was tested. Brines were created from three different compositions: 80/20, 90/10, and 95/5 magnesium chloride/potassium sulfate to simulate the brine generated when the deicing compositions melt and dissolve into the snow and ice. A piece of off-white, short pile carpet and a new pair of Redwing® work boots were used for the testing.

The brines were created by dissolving the deicing compositions in distilled water at two different concentrations. Low concentration solutions (21% wt.) were prepared by weighing 15 grams of each deicing composition into respective glass pie pans and adding 55 mL of distilled water. The pans were each swirled to dissolve as much of the deicing composition as possible. For each deicing composition, the resulting brine was then transferred from the pan to each respective carpet piece by stepping into the pie pan while wearing the boots and allowing the deicing solution to come into contact with the sole of the boot. From the pie pan, a step was taken onto the carpet piece to simulate walking across the carpet. Each carpet piece was then allowed to dry. High concentration (38% wt.) solutions were then prepared by weighing 15 grams of each deicing composition into respective glass pie pans and adding 25 mL of distilled water. Each pan was swirled to dissolve as much of the deicing composition as possible. The resulting brines were each transferred to respective carpet pieces using the procedure above, and the pieces were allowed to dry. The carpet pieces were then visually inspected to determine if any staining occurred. For some of the compositions, residual $MgCl_2$ crystals were observed once the compositions dried, leaving behind a crystalline build-up. However, this build-up could be easily removed and did not stain the carpet pieces. None of the tested compositions were observed to stain the carpet pieces at any concentration. Thus, compositions according to the invention will be non-staining.

We claim:

1. A deicing composition consisting essentially of magnesium chloride and potassium sulfate, wherein the weight ratio of magnesium chloride to potassium sulfate is from about 50:50 to about 95:5.

2. The composition of claim 1, wherein said composition is a blend of discrete pieces of magnesium chloride and potassium sulfate.

3. The composition of claim 2, said pieces being selected from the group consisting of pellets, cubes, granules, flakes, powder, crystals, and mixtures thereof.

4. The composition of claim 1, wherein said magnesium chloride comprises magnesium chloride hexahydrate.

5. The composition of claim 1, wherein said potassium sulfate comprises agricultural grade potassium sulfate granules or pellets.

6. The composition of claim 1, said composition having a moisture content of from about 0% to about 5% by weight, based upon the total weight of the composition taken as 100% by weight.

7. A method of melting or preventing the build-up of ice or snow on a surface, said method comprising applying a composition consisting essentially of magnesium chloride and potassium sulfate to said surface.

8. The method of claim 7, wherein said composition is a blend of discrete pieces of magnesium chloride and potassium sulfate.

9. The method of claim 7, said applying comprises dispersing said composition substantially uniformly over said surface.

10. The method of claim 7, wherein said surface is selected from the group consisting of a roadway, driveway, walkway, sidewalk, patio, porch, parking lot, and other paved surfaces.

11. The method of claim 7, wherein said composition is applied at a level of from about 10 to about 100 grams of composition per square yard of said surface.

12. A method of melting or preventing the build-up of ice or snow on a surface, said method comprising applying a composition comprising magnesium chloride and potassium sulfate to said surface, said composition being substantially free of magnesium sulfate, calcium chloride, sodium chloride, glycerol-containing by-products, and alcohols.

13. The method of claim 12, said applying comprises dispersing said composition substantially uniformly over said surface.

14. The method of claim 12, wherein said surface is selected from the group consisting of a roadway, driveway, walkway, sidewalk, patio, porch, parking lot, and other paved surfaces.

15. The method of claim 12, wherein said composition is applied at a level of from about 10 to about 100 grams of composition per square yard of said surface.

16. A deicing composition consisting essentially of magnesium chloride and potassium sulfate, said composition having a moisture content of from about 0% to about 5% by weight, based upon the total weight of the composition taken as 100% by weight.

* * * * *